United States Patent
Matsumoto et al.

(10) Patent No.: US 9,333,862 B2
(45) Date of Patent: May 10, 2016

(54) CONTROL DEVICE FOR AC ELECTRIC VEHICLE

(75) Inventors: Takeo Matsumoto, Tokyo (JP); Kotaro Matsuda, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/409,615

(22) PCT Filed: Jun. 28, 2012

(86) PCT No.: PCT/JP2012/066597
§ 371 (c)(1),
(2), (4) Date: Dec. 19, 2014

(87) PCT Pub. No.: WO2014/002233
PCT Pub. Date: Jan. 3, 2014

(65) Prior Publication Data
US 2015/0175007 A1    Jun. 25, 2015

(51) Int. Cl.
*B01L 3/00* (2006.01)
*B60L 11/08* (2006.01)
(Continued)

(52) U.S. Cl.
CPC ... *B60L 3/00* (2013.01); *B60L 9/18* (2013.01); *B60L 11/08* (2013.01); *H02M 5/458* (2013.01); *B60L 2200/26* (2013.01); *Y02T 10/7241* (2013.01)

(58) Field of Classification Search
CPC . Y02T 10/72; Y02T 10/7208; Y02T 10/7258; Y02T 10/7266; Y02T 10/7275; Y02T 10/7283; Y02T 10/7038; Y02T 10/64; Y02T 10/62; B60L 3/00; B60L 3/0023; B60L 3/0046; B60L 3/0076; B60L 1/00; B60L 1/14; B60L 2240/52; B60L 2240/525; B60L 2240/526; B60L 2240/529; B60L 2240/40
USPC .................................. 701/22, 36; 363/13
See application file for complete search history.

(56) References Cited

U.S. PATENT DOCUMENTS

| 5,642,020 | A | 6/1997 | Miyazaki | |
|---|---|---|---|---|
| 2003/0118891 | A1* | 6/2003 | Saito | ............. B60L 1/003 429/62 |

(Continued)

FOREIGN PATENT DOCUMENTS

| JP | 5-115106 A | 5/1993 |
|---|---|---|
| JP | 7-123501 A | 5/1995 |

(Continued)

OTHER PUBLICATIONS

International Search Report (PCT/ISA/210) mailed on Sep. 18, 2012, by the Japanese Patent Office as the International Searching Authority for International Application No. PCT/JP2012/066597.

(Continued)

*Primary Examiner* — Thomas G Black
*Assistant Examiner* — Sara Lewandroski
(74) *Attorney, Agent, or Firm* — Buchanan Ingersoll & Rooney PC

(57) ABSTRACT

A control device for an AC electric vehicle that is applied to a configuration in which an SIV is connected to an intermediate DC circuit unit between a CONV that converts an AC voltage input through a main transformer to a DC voltage and an INV that converts the DC voltage to an AC voltage, in which a carrier frequency fc of the CONV is changed on the basis of initial temperature (initial value of Tcnv) of a converter main circuit element when a vehicle is stopped and input current Isiv of the SIV such that a temperature variation of a converter main circuit element when the vehicle is stopped is reduced.

6 Claims, 3 Drawing Sheets

(51) Int. Cl.
*B60L 9/18* (2006.01)
*B60L 3/00* (2006.01)
*H02M 5/458* (2006.01)

(56) References Cited

U.S. PATENT DOCUMENTS

| | | | | |
|---|---|---|---|---|
| 2007/0114965 | A1* | 5/2007 | Kutsuna | B60L 11/1803 318/807 |
| 2009/0021198 | A1* | 1/2009 | Okamura | B60K 6/445 318/400.3 |
| 2010/0026090 | A1* | 2/2010 | Nakatsu | H05K 7/20927 307/9.1 |
| 2010/0054010 | A1* | 3/2010 | Darroman | B60L 1/00 363/131 |
| 2010/0332065 | A1* | 12/2010 | Lin | B60L 7/16 701/22 |
| 2011/0276214 | A1 | 11/2011 | Matsumoto | |
| 2012/0112695 | A1* | 5/2012 | Nishi | B60L 3/0046 320/109 |
| 2012/0296507 | A1* | 11/2012 | Matsumoto | H02P 23/009 701/22 |
| 2012/0323430 | A1* | 12/2012 | Nakamura | B60L 11/1803 701/22 |
| 2013/0069570 | A1* | 3/2013 | Chen | B60L 3/003 318/400.09 |
| 2013/0175858 | A1* | 7/2013 | Sakurai | B60L 11/1812 307/9.1 |
| 2013/0200828 | A1* | 8/2013 | Miller | H02M 7/5395 318/400.23 |
| 2014/0126154 | A1* | 5/2014 | Higuchi | B60L 11/1803 361/714 |

FOREIGN PATENT DOCUMENTS

| | | | |
|---|---|---|---|
| JP | 10-004610 | A | 1/1998 |
| JP | 11-313406 | A | 11/1999 |
| JP | 2001-186775 | A | 7/2001 |
| JP | 2001186775 | A * | 7/2001 |
| JP | 2003-199354 | A | 7/2003 |
| JP | 4589448 | B2 | 12/2010 |

OTHER PUBLICATIONS

Written Opinion (PCT/ISA/237) mailed on Sep. 18, 2012, by the Japanese Patent Office as the International Searching Authority for International Application No. PCT/JP2012/066597.

* cited by examiner

CONTROL DEVICE FOR AC ELECTRIC VEHICLE

FIELD

The present invention relates to a control device for an AC electric vehicle.

BACKGROUND

A CI/SIV integral configuration in which an auxiliary power unit (Static-Inverter, hereinafter referred to as an "SIV" as occasion demands) is connected to an intermediate DC circuit unit (also called as an "intermediate link connection unit") of a main conversion device (Converter-Inverter, hereinafter referred to as a "CI" as occasion demands) that is a propulsion control device has in recent years become commonly used for a control device for an AC electric vehicle.

In contrast, in the case of a configuration in which the CI and the SIV are configured independently of each other (CI/SIV independent configuration), when a vehicle is stopped, the SIV continues to operate so as to supply power to service equipment (lighting, air-conditioning, etc.) whereas the CI is not required to operate because a main motor (Main Motor: MM) that is a load is stopped and thus both the converter and the inverter are stopped.

In the case of the CI/SIV integral configuration, because the SIV is connected to the output stage of the converter as described above, it is necessary to operate the converter in order to continuously operate the SIV. That is, in the case of the CI/SIV integral configuration, the converter operates even when a vehicle is stopped. Accordingly, it is known that the converter is supplied with electric power for a longer period in the CI/SIV integral configuration than in the CI/SIV independent configuration.

When the converter is supplied with electric power for a longer period, it is thought that this is also disadvantageous in terms of lifetime because electrical stress applied to elements increases.

Here, an example of a method for increasing the lifetime of a main circuit element is disclosed in the following Patent Literature 1, for example. The approach adopted in Patent Literature 1 is to suppress the generation loss of the main circuit semiconductor to prolong the lifetime. When the main circuit semiconductor has, for example, a module structure, it is known that the main circuit semiconductor has a soldered joint portion therein and the soldered joint portion is subjected to a repetitive heat cycle and thus suffers fatigue breakdown. Therefore, it is thought that this method would be an effective way to prolong the lifetime if the influence of the heat cycle can be reduced by suppressing the generation loss.

CITATION LIST

Patent Literature

Patent Literature 1: Japanese Patent Application Laid-open No. H10-4610

SUMMARY

Technical Problem

As described above, in the case of the CI/SIV integral configuration, it is estimated that there are disadvantages regarding the lifetime of the device when compared with the CI/SIV independent configuration because the converter is required to constantly operate. In this case, it would be better to adopt a method capable of reducing the loss, for example, by reducing the switching frequency in accordance with the speed of the vehicle as in the case of Patent Literature 1 described above. However, it is impossible to reduce the switching frequency immoderately, for example, because of restrictions on the generation loss of the main transformer connected to the input side of the converter (when the switching frequency decreases, a ripple component superimposed on the output voltage of the main transformer becomes large). Accordingly, it is difficult to prolong the lifetime by means of reducing the loss.

The present invention has been achieved in view of the above and an object of the present invention is to obtain a control device for an AC electric vehicle that can prolong the lifetime of the converter main circuit element by reducing the influence of a heat cycle.

Solution to Problem

In order to solve the above problems and achieve the object, the present invention relates to a control device for an AC electric vehicle that is applied to a configuration in which an auxiliary power unit is connected to an intermediate DC circuit unit between a converter that converts an AC voltage input through a main transformer to a DC voltage and an inverter that converts the DC voltage to an AC voltage, wherein a carrier frequency of the converter is changed on a basis of initial temperature of a converter main circuit element when a vehicle is stopped and input current of the auxiliary power unit such that a temperature variation of a converter main circuit element when the vehicle is stopped is reduced.

Advantageous Effects of Invention

According to the present invention, an effect is obtained that the lifetime of the converter main circuit element can be prolonged by reducing the influence of the heat cycle.

DESCRIPTION OF EMBODIMENTS

A control device for an AC electric vehicle according to embodiments of the present invention will be described below with reference to the accompanying drawings. The present invention is not limited to the embodiments described below.

First Embodiment

Configuration of Control Device for AC Electric Vehicle

Figure 1:
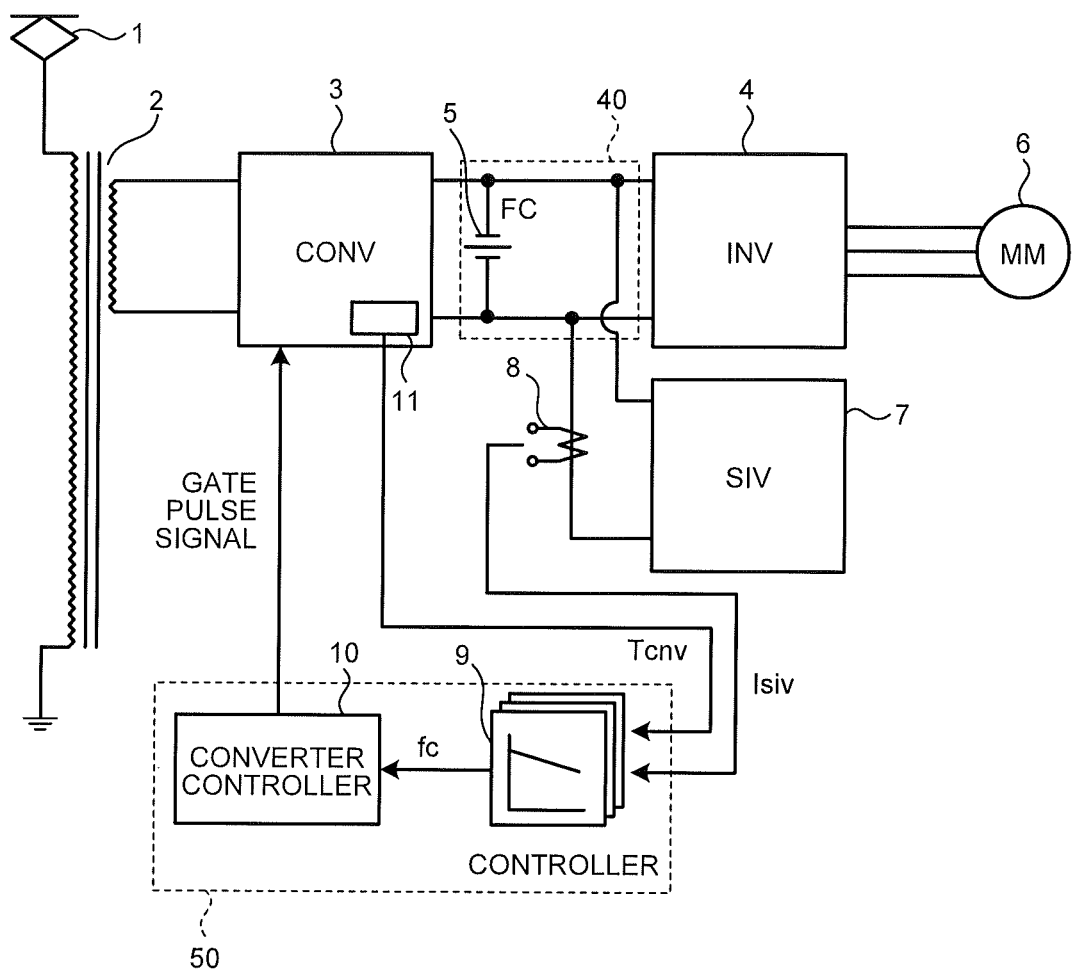
FIG. 1 is a diagram showing an example of the configuration of a control device for an AC electric vehicle according to a first embodiment.

FIG. 1 is a diagram showing an example of the configuration of a control device for an AC electric vehicle according to a first embodiment of the present invention. As shown in FIG. 1, the control device for the AC electric vehicle according to the first embodiment is configured to include a pantograph 1 supplied with AC power from an AC overhead line, a main transformer 2 to which the AC power supplied from the pantograph 1 is input, a converter (hereinafter referred to as a "CONV") 3 to which an AC voltage of the main transformer 2 is applied to convert the AC voltage to a DC voltage, an inverter (hereinafter referred to as an "INV") 4 that converts the DC voltage output from the CONV 3 to three-phase AC, a filter capacitor (hereinafter referred to as an "FC") 5 which is provided in an intermediate DC circuit unit 40 (on the DC output side of the CONV 3) to smooth the DC voltage of the CONV 3, a main motor (MM) 6 driven with the AC voltage of the INV 4, an SIV 7 which is connected to the intermediate DC circuit unit 40 like the INV 4, a current sensor 8 which is provided on the input side of the SIV 7 to detect a part of the load current, and a controller 50 to which an output (temperature sensor output) Tcnv of a temperature sensor 11 is input. The temperature sensor 11 is provided to a mounting face on which a main circuit element of the converter (converter main circuit element) is mounted or provided to a peripheral portion thereof. The controller 50 is configured to include a lookup table (converter-carrier-frequency lookup table) 9 for outputting a desired converter carrier frequency fc on the basis of input current Isiv detected by the current sensor 8 and the temperature sensor output Tcnv and a converter controller 10 to which the converter carrier frequency fc is input to generate a gate pulse signal for driving the converter main circuit element to perform a switching operation at the converter carrier frequency fc.

One end on the primary side of the main transformer 2 is connected to the AC overhead line through the pantograph 1 and the other end on the primary side of the main transformer 2 is grounded to the ground potential through a wheel and a rail (not shown). That is, the electrical power fed from a transformer substation (not shown) is received through the AC overhead line, the pantograph 1, the wheel, and the rail. During power running of an electric vehicle, the INV 4 performs power conversion to drive the main motor 6. On the other hand, during braking, the main motor 6 is made to operate as an electric generator as occasion demands, whereby the main motor 6 is made to operate as a regeneration brake for the electric vehicle.

Figure 2:
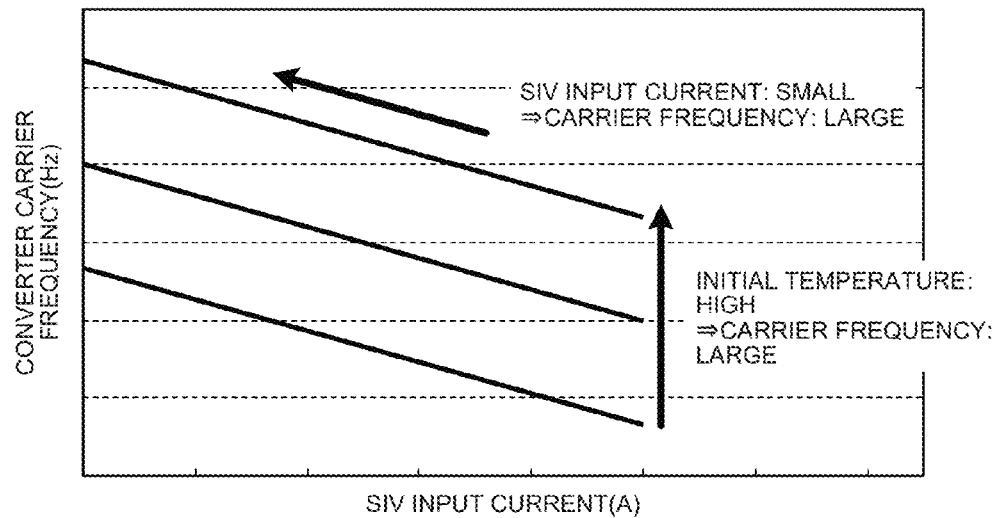
FIG. 2 is a diagram showing an example of a converter-carrier-frequency lookup table.
Figure 3:
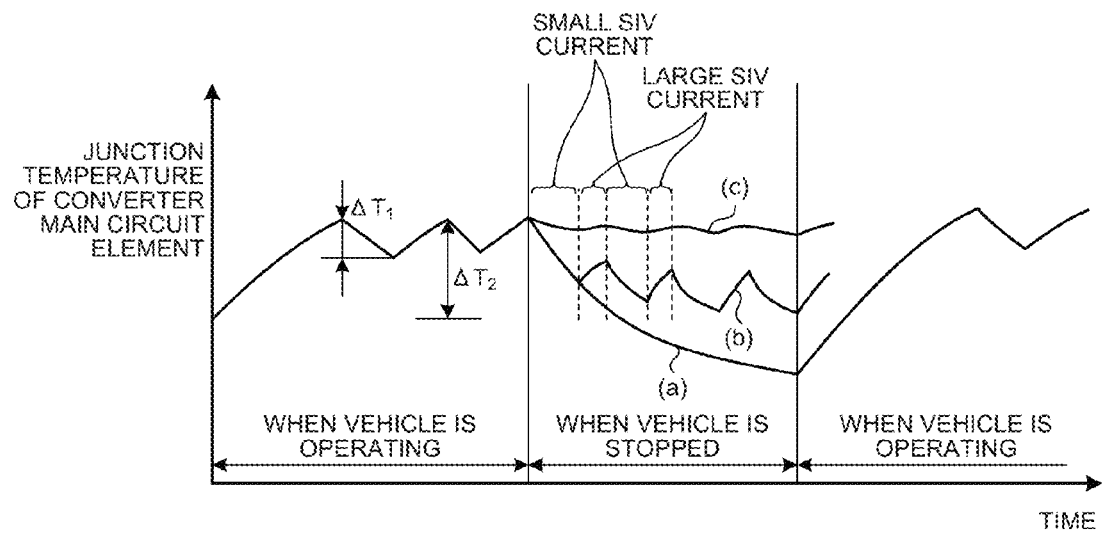
FIG. 3 is a diagram schematically showing the behavior of a converter main circuit element when a vehicle is operating and when the vehicle is stopped.

Next, the main operation of the control device for the AC electric vehicle according to the first embodiment will be described with reference to FIGS. 1 to 3. FIG. 2 is a diagram showing an example of a converter-carrier-frequency lookup table, and shows the relationship between the converter carrier frequency fc and the SIV input current Isiv using the initial temperature of the converter main circuit element (for example, "temperature sensor output Tcnv" immediately after the vehicle is stopped) as a parameter. FIG. 3 schematically shows the behavior of the converter main circuit element both when the vehicle is operating and when the vehicle is stopped. In FIG. 3, the behavior of the converter main circuit element is shown in terms of time-variation of the junction temperature of the converter main circuit element both when the vehicle is operating and when the vehicle is stopped.

First, the control device for the AC electric vehicle according to the first embodiment controls the converter carrier frequency fc such that it is increased as the input current Isiv of the SIV 7 decreases. Through this control, the generation loss in the converter main circuit element can be increased when the input current Isiv of the SIV 7 is small; therefore, the temperature increase of the converter main circuit element can be kept substantially constant irrespective of the magnitude of the input current of the SIV 7. Furthermore, the converter carrier frequency fc is controlled such that it is increased as the initial temperature of the converter main circuit element, which is defined as described above, is higher. Through this control, the operation characteristic can be changed in accordance with the initial temperature of the converter main circuit element; therefore, the temperature increase of the converter main circuit element can be kept substantially constant irrespective of the operation state.

Next, the meaning of the control shown in FIG. 2 will be described in detail with reference to FIG. 3. In FIG. 3, when the vehicle is operating, the junction temperature of the converter main circuit element (hereinafter simply referred to as "element temperature") varies in accordance with the vehicle operation. On the other hand, once the vehicle is stopped, the element temperature simply decreases as represented by (a) of FIG. 3 in the case of the CI/SIV independent configuration, whereas the element temperature in the case of the CI/SIV integral configuration repetitively increases and decreases in accordance with the operation condition of the SIV 7 as represented by (b) of FIG. 3. It is known that the lifetime of the element becomes shorter as the variation width of the temperature of the element ($\Delta T1$ (variation width during operation) and $\Delta T2$ (variation width from the initial temperature) in FIG. 3) becomes larger and as the frequency of the variation having a large variation width like $\Delta T1$ and $\Delta T2$ is larger. Therefore, when the operation as represented by (b) in FIG. 3 is repeated, it causes a reduction of the lifetime of the element.

On the other hand, in the configuration of the first embodiment, when the initial value of the element temperature or the temperature corresponding to the element temperature (for example, the temperature of a cooling unit) when the vehicle is stopped is referred to, and the converter carrier frequency fc is controlled such that it is reduced when the SIV current when the vehicle is stopped is large and it is increased when the SIV current when the vehicle is stopped is small. Accordingly, the behavior of the element temperature can be changed to a behavior having a small variation width as represented by (c) in FIG. 3. That is, according to the control device for the AC electric vehicle of the first embodiment, the lifetime of the converter main circuit element can be prolonged by reducing the influence of the heat cycle.

When the control as represented by (c) in FIG. 3 is performed, the variation width of the element temperature (not only $\Delta T1$, but also $\Delta T2$) is also greatly reduced as compared with (a) of FIG. 3 representing the behavior of the CI/SIV independent configuration. That is, it can be said that the control device for the AC electric vehicle according to the first embodiment is a remarkably excellent control system from the viewpoint of prolongation of the lifetime irrespective of the configuration of the device, that is, whether the device has the CI/SIV integral configuration or the CI/SIV independent configuration.

In the control of the first embodiment, the output of the temperature sensor 11 which is necessary for the control of the CONV 3 may be only the output of the temperature sensor immediately after the vehicle is stopped.

As described above, according to the control device for the AC electric vehicle of the first embodiment, on the basis of the initial temperature of the converter main circuit element when the vehicle is stopped and the SIV input current, the converter carrier frequency is changed such that temperature variation of the converter main circuit element when the vehicle is stopped becomes small. Therefore, the lifetime of the converter main circuit element can be prolonged by reducing the influence of the heat cycle.

Furthermore, according to the control device for the AC electric vehicle of the first embodiment, the initial temperature of the converter main circuit element is referred to, and, the converter carrier frequency is controlled such that it is reduced when the SIV input current when the vehicle is stopped is large and it is increased when the SIV input current when the vehicle is stopped is small. Therefore, the lifetime of the converter main circuit element can be prolonged by reducing the influence of the heat cycle.

It is more effective for the initial value in the variable control of the carrier frequency to be set to a larger value as the initial temperature of the converter main circuit element is higher.

Second Embodiment

Figure 4:
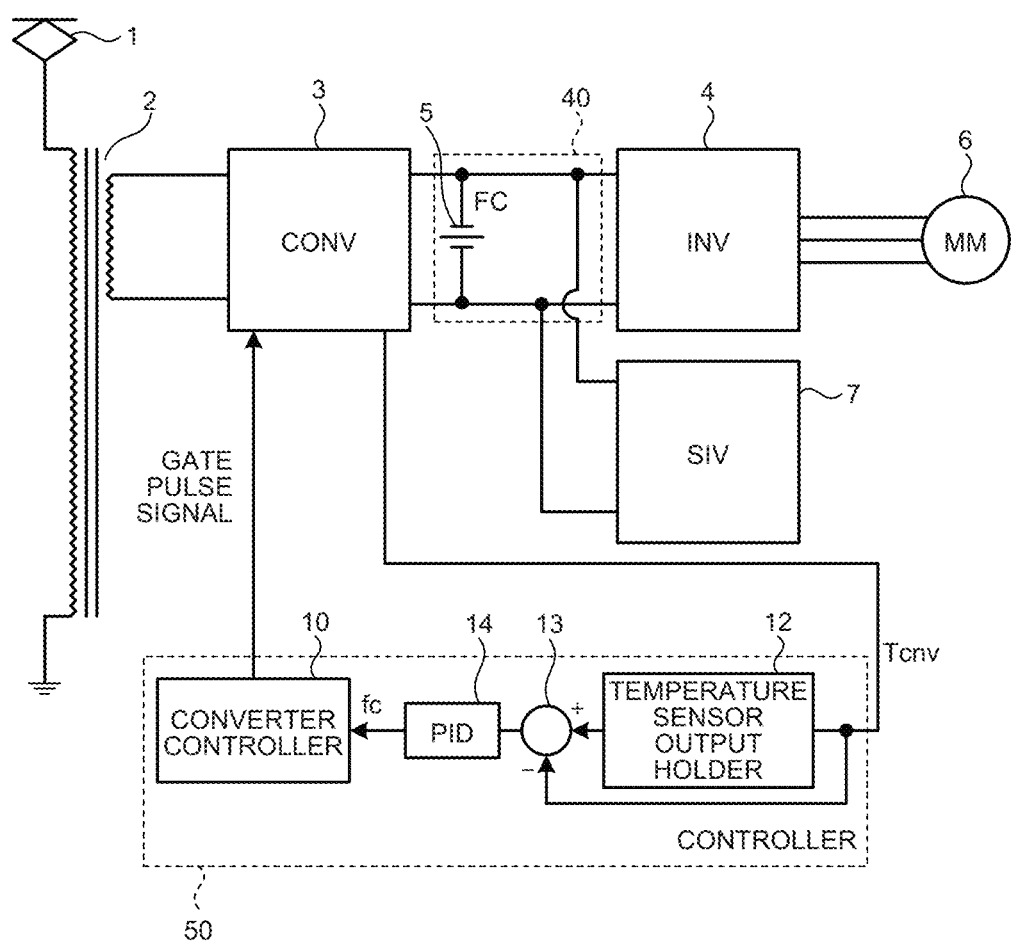
FIG. 4 is a diagram showing an example of the configuration of a control device for an AC electric vehicle according to a second embodiment.

FIG. 4 is a configuration diagram showing the configuration of a control device for an AC electric vehicle according to a second embodiment of the present invention. The control device for the AC electric vehicle shown in FIG. 4 is different from that in the first embodiment shown in FIG. 1 in the configuration of the controller 50. Specifically, in place of the configuration in which the converter-carrier-frequency lookup table 9 is provided, the controller 50 is configured to include a temperature sensor output holder 12 that holds the temperature sensor output Tcnv immediately after the vehicle is stopped, a difference calculating unit 13 that calculates the difference value between the output of the temperature sensor output holder 12 and the temperature sensor output Tcnv, which is a real-time temperature output, and a PID operator 14, which is an arithmetic processing unit that generates the converter carrier frequency fc on the basis of the output of the difference calculating unit 13. The other configuration is the same as or similar to the configuration of the first embodiment shown in FIG. 1. The common components are represented by the same reference numerals and the descriptions thereof are omitted.

Next, a control method of the control device for the AC electric vehicle according to the second embodiment will be described. In the first embodiment, the carrier frequency fc is controlled such that it is changed using the SIV input current when the vehicle is stopped as a parameter. However, in the second embodiment, the converter carrier frequency fc is calculated on the basis of the output of the difference calculating unit 13 such that the element temperature when the vehicle is stopped is kept constant. Specifically, the carrier frequency fc is controlled such that it is increased when the decrease from the element temperature immediately after the vehicle is stopped is large and it is reduced when the decrease from the element temperature immediately after the vehicle is stopped is small. Through this control, the behavior represented by (c) in FIG. 3 can be obtained; therefore, the same effect as the control device for the AC electric vehicle according to the first embodiment can be obtained.

When the converter carrier frequency fc is changed, there is a concern that the behavior of the harmonic noise components contained in return current changes and this change influences ground signal equipment. Therefore, it is preferable that a change of the converter carrier frequency fc is limited to only when the vehicle is stopped. However, when there is no concern about the influence on the ground signal equipment, it is needless to say that the change of the converter carrier frequency fc is not necessarily limited to when the vehicle is stopped.

As described above, according to the control device for the AC electric vehicle of the second embodiment, the carrier frequency is changed on the basis of the difference value between the initial temperature of the converter main circuit element when the vehicle is stopped and the detected temperature of the converter main circuit element such that the temperature variation of the converter main circuit element is reduced. Therefore, the lifetime of the converter main circuit element can be prolonged by reducing the influence of the heat cycle.

Furthermore, according to the control device for the AC electric vehicle of the second embodiment, the converter carrier frequency is controlled such that it is increased when the difference value described above is large and it is reduced when the difference value is small. Therefore, the lifetime of the converter main circuit element can be more effectively prolonged.

The configurations described in the first and second embodiments are examples of the configuration of the present invention. Therefore, it is obvious that these configurations can be combined with other publicly-known techniques or can be altered by omitting some parts or the like without departing from the scope of the present invention.

INDUSTRIAL APPLICABILITY

As described above, the control device for the AC electric vehicle according to the present invention is useful as the invention that can prolong the lifetime of the converter main circuit element by reducing the influence of the heat cycle.

REFERENCE SIGNS LIST 1 pantograph
2 main transformer
3 CONV (converter)
4 INV (inverter)
6 main motor (MM)
7 SIV (auxiliary power unit)
8 current sensor
9 converter-carrier-frequency lookup table
10 converter controller
11 temperature sensor
12 temperature sensor output holder
13 difference calculating unit
14 arithmetic processing unit (PID operator)
40 intermediate DC circuit unit
50 controller

The invention claimed is:

1. A control device for an AC electric vehicle that is applied to a configuration in which an auxiliary power unit that supplies power to a load including lighting and air-conditioning is connected to an intermediate DC circuit unit between a converter that converts an AC voltage input through a main transformer to a DC voltage and an inverter that converts the DC voltage to an AC voltage, wherein
a carrier frequency of the converter is changed on a basis of initial temperature that is a temperature of a converter main circuit element at a time when a vehicle is stopped and input current of the auxiliary power unit such that a temperature variation of the converter main circuit element in a vehicle stopped state where the vehicle has entered a stopped state is reduced.

2. The control device for the AC electric vehicle according to claim 1, wherein the initial temperature is referred to, and the carrier frequency is controlled such that the carrier frequency is reduced when the input current in the vehicle stopped state is large and the carrier frequency is increased when the input current in the vehicle stopped state is small.

3. The control device for the AC electric vehicle according to claim 2, wherein an initial value in variable control of the carrier frequency is set to a larger value as the initial temperature is larger.

4. A control device for an AC electric vehicle that is applied to a configuration in which an auxiliary power unit that supplies power to a load including lighting and air-conditioning is connected to an intermediate DC circuit unit between a converter that converts an AC voltage input through a main transformer to a DC voltage and an inverter that converts the DC voltage to an AC voltage, wherein a carrier frequency of the converter is changed on a basis of a difference value between initial temperature that is a temperature of a converter main circuit element at a time when a vehicle is stopped and detected temperature of the converter main circuit element such that a temperature variation of the converter main circuit element in a vehicle stopped state where the vehicle has entered a stopped state is reduced.

5. The control device for the AC electric vehicle according to claim 4, wherein the carrier frequency is controlled such that the carrier frequency is increased when the difference value is large and the carrier frequency is reduced when the difference value is small.

6. The control device for the AC electric vehicle according to claim 4, wherein variable control of the carrier frequency is limited to only in the vehicle stopped state.

* * * * *